(12) United States Patent
Zhang et al.

(10) Patent No.: US 9,438,042 B2
(45) Date of Patent: Sep. 6, 2016

(54) DIRECT CURRENT POWER DELIVERY SYSTEM AND METHOD

(71) Applicant: General Electric Company, Schenectady, NY (US)

(72) Inventors: Di Zhang, Niskayuna, NY (US); Luis Jose Garces, Niskayuna, NY (US); Jian Dai, Niskayuna, NY (US); Rixin Lai, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 758 days.

(21) Appl. No.: 13/769,919

(22) Filed: Feb. 19, 2013

(65) Prior Publication Data

US 2014/0233277 A1    Aug. 21, 2014

(51) Int. Cl.
*H02J 3/36* (2006.01)
*H02J 3/38* (2006.01)
*H02J 13/00* (2006.01)

(52) U.S. Cl.
CPC ............... *H02J 3/36* (2013.01); *H02J 3/382* (2013.01); *H02J 13/0003* (2013.01); *Y02E 40/72* (2013.01); *Y04S 10/123* (2013.01)

(58) Field of Classification Search
CPC .................................................. H02J 3/36
USPC ......................................................... 363/35
See application file for complete search history.

(56) References Cited

U.S. PATENT DOCUMENTS

| | | | |
|---|---|---|---|
| 3,401,234 A * | 9/1968 | Heald | G08B 25/08 340/326 |
| 4,398,178 A | 8/1983 | Russ et al. | |
| 4,648,018 A | 3/1987 | Neupauer | |
| 7,176,589 B2 | 2/2007 | Rouguette | |
| 8,150,265 B2 | 4/2012 | Henderson | |
| 8,199,798 B2 | 6/2012 | Brekke et al. | |
| 2007/0273205 A1 | 11/2007 | Aoyama | |
| 2008/0285317 A1* | 11/2008 | Rotzoll | H02M 7/003 363/80 |
| 2010/0052940 A1 | 3/2010 | Hesbol et al. | |
| 2010/0133901 A1* | 6/2010 | Zhang | H02M 5/458 307/11 |

(Continued)

FOREIGN PATENT DOCUMENTS

JP    7240704 A    9/1995
WO    2006128400 A1    12/2006

OTHER PUBLICATIONS

"Information Transmission System in an HVDC Link," Research Disclosure, Aug. 1, 1989, p. 585, No. 304, New York, USA.

(Continued)

*Primary Examiner* — Kenneth B Wells
*Assistant Examiner* — James P Evans
(74) *Attorney, Agent, or Firm* — Ann M. Agosti

(57) ABSTRACT

A power transmission system includes a first unit for carrying out the steps of receiving high voltage direct current (HVDC) power from an HVDC power line, generating an alternating current (AC) component indicative of a status of the first unit, and adding the AC component to the HVDC power line. Further, the power transmission system includes a second unit for carrying out the steps of generating a direct current (DC) voltage to transfer the HVDC power on the HVDC power line, wherein the HVDC power line is coupled between the first unit and the second unit, detecting a presence or an absence of the added AC component in the HVDC power line, and determining the status of the first unit based on the added AC component.

18 Claims, 5 Drawing Sheets

(56) References Cited

U.S. PATENT DOCUMENTS

| | | |
|---|---|---|
| 2011/0140511 A1 | 6/2011 | Larsen |
| 2012/0195385 A1 | 8/2012 | Puchianu |
| 2013/0322131 A1* | 12/2013 | Sun .......................... H02J 3/36 363/35 |

OTHER PUBLICATIONS

Popat, Miteshkumar, et al., "Fault Ride-Through of PMSG-Based Offshore Wind Farm Connected Through Cascaded Current Source Converter-Based HVDC," Power Electronics and Machines in Wind Applications (PEMWA), Jul. 16, 2012, pp. 1-7.

Chen, Yanhu, et al., "Experimental Study of a Mechatronic System Applied for Subsea Science Instruments," 2010 IEEE/ASME International Conference on Advanced Intelligent Mechatronics, Jul. 6-9, 2010, pp. 1257-1262, Montrieal, Canada.

Yazdani, Javad, et al., "Modelling, Developing and Implementing Sub-Sea Power-Line Communications Networks," 2005, pp. 310-316, Blackburn, UK.

"Unique System Creates Hydraulic Power Subsea for Cost-Effective Control and Monitoring of Two Pipeline End Manifold Valves," Weatherford, 2011.

Woodroffe, Adrian, et al., "Power Delivery to Subsea Cabled Observatories," Oceanworks International Corp., 2008.

EP Search Report and Written Opinion issued May 22, 2014 in connection with corresponding EP Patent Application No. 13196314.2.

* cited by examiner

DIRECT CURRENT POWER DELIVERY SYSTEM AND METHOD

STATEMENT REGARDING FEDERALLY SPONSORED RESEARCH & DEVELOPMENT

This invention was made with Government support under sub contract number 08121-2901-01 of prime contract number DE-AC26-07NT42677 awarded by the United States Department of Energy. The Government has certain rights in the invention.

BACKGROUND

Embodiments of the present disclosure relate generally to a power delivery system and, more particularly, to a system and a method for communicating information in the power delivery system.

Power may be delivered from onshore or offshore platforms to electric loads at seabed or remote offshore locations for various applications in the oil and gas industry and the wind power industry, for example. Due to growing industry demands, the power needs to be delivered more effectively with lower cost and higher reliability. The electrification trends, particularly in subsea processing for the oil and gas industry and offshore wind power production, include more electric loads, higher power requirements, deeper water depth, and longer distances of power supply.

To serve a large number of electric loads at subsea and/or offshore locations, electric power typically needs to be transmitted via a power transmission bus from onshore or offshore platform power sources. In the oil and gas industry, the power transmission bus may be installed for a short or long distance between the power sources and the subsea and/or offshore locations. In some instances, the electric loads may vary depending upon the applications and/or anomalies at the subsea and/or offshore locations, which in turn changes the power requirements at the subsea and/or offshore locations. Thus, there is a need to communicate this information from the subsea and/or offshore locations to the onshore or offshore platform power sources to control power transmission in the power delivery system.

In a conventional power delivery system, an optical cable may be installed along with the power transmission bus between the onshore or offshore platform power sources and the subsea and/or offshore locations. This optical cable is used to communicate information, such as electric load requirements or anomalies at the subsea and/or offshore locations. However, in some instances, the optical cable may be damaged due to environmental conditions and the information may not be successfully transmitted from the subsea and/or offshore locations to the onshore or offshore platform power sources. This in turn may cause imbalances in power transmission and may affect the steady state of the system. Thus, there is need for an improved method and system for communicating information in the power delivery system.

BRIEF DESCRIPTION

In accordance with one embodiment described herein, a power transmission system is presented. The power transmission system includes a first unit for carrying out the steps of receiving HVDC power from an HVDC power line, generating an alternating current (AC) component indicative of a status of the first unit, and adding the AC component to the HVDC power line. Further, the power transmission system includes a second unit for carrying out the steps of generating a direct current (DC) voltage to transfer the HVDC power on the HVDC power line, wherein the HVDC power line is coupled between the first unit and the second unit, detecting a presence or an absence of the added AC component in the HVDC power line, and determining the status of the first unit based on the added AC component.

In accordance with a further aspect of the present disclosure, a method is presented. The method includes generating an alternating current (AC) component by a first unit, wherein the AC component indicates a status of the first unit. Further, the method includes adding, by the first unit, the AC component to a high voltage direct current (HVDC) power line coupled between the first unit and a second unit. Also, the method includes detecting, by the second unit, a presence or an absence of the added AC component in the HVDC power line. In addition, the method includes determining the status of the first unit based on the added AC component.

In accordance with another aspect of the present disclosure, a power transmission system is presented. The power transmission system includes a first unit for carrying out the steps of transmitting HVDC power on an HVDC power line, generating an alternating current (AC) component indicative of a status of the first unit, and adding the AC component to the HVDC power line. Further, the power transmission system includes a second unit for carrying out the steps of receiving the HVDC power from the HVDC power line, wherein the HVDC power line is coupled between the first unit and the second unit, detecting a presence or an absence of the added AC component in the HVDC power line, and determining the status of the first unit based on the added AC component.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of exemplary systems and methods for communicating information on a DC transmission bus in a power delivery system are presented. By employing the methods and the various embodiments of the system described hereinafter, anomalies and/or electric load requirements are communicated, and accordingly power transmission is controlled in the power delivery system.

Figure 1:
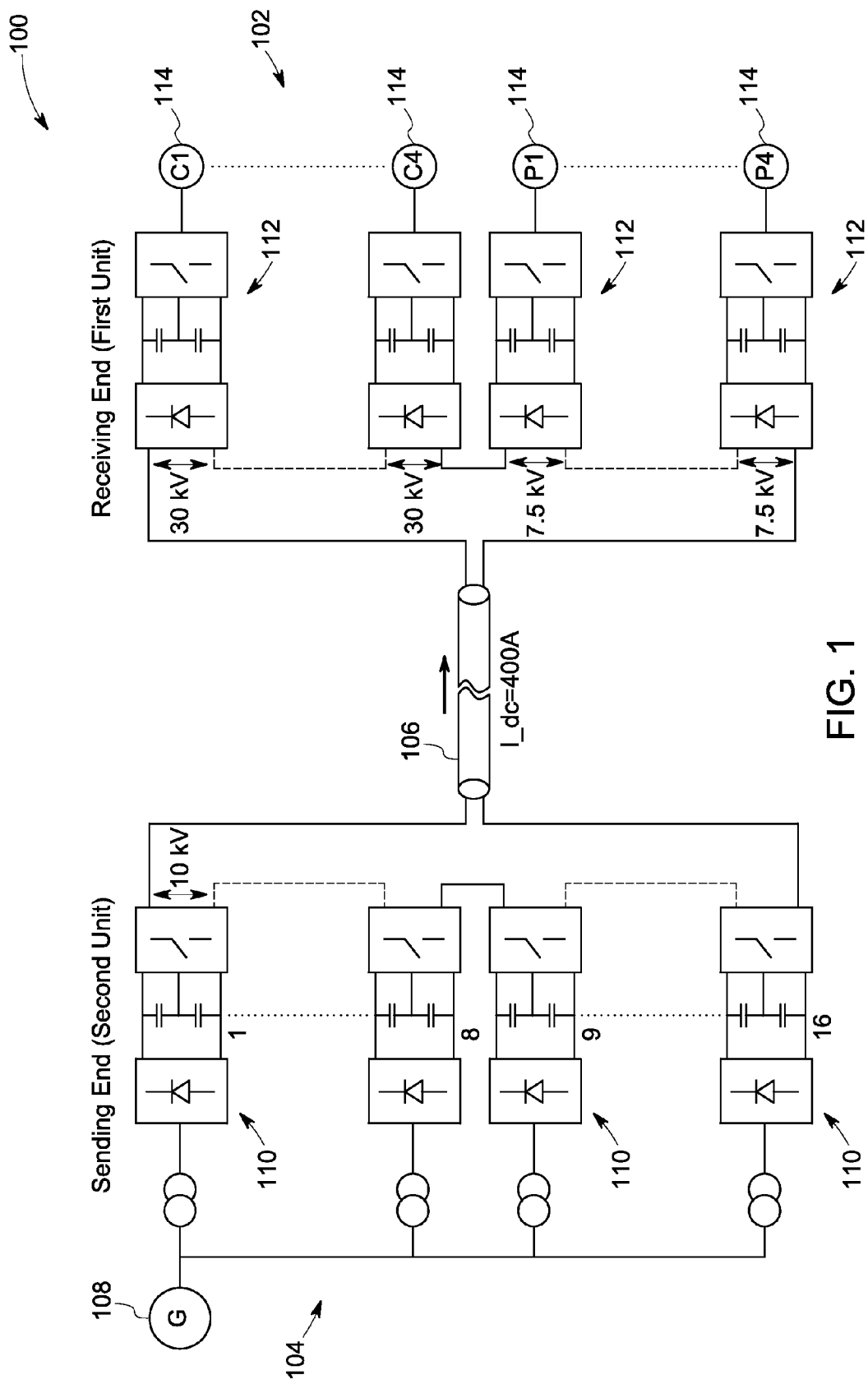
FIG. 1 is a diagram of a power delivery system illustrating a direct current (DC) power transmission from a second unit to a first unit, in accordance with aspects of the present disclosure.

Turning now to the drawings, and referring to FIG. 1, a power delivery system illustrating a direct current (DC) power transmission, in accordance with aspects of the present disclosure, is depicted. The power delivery system 100 includes a first unit 102, a second unit 104, and a DC power transmission bus 106. In one example of an oil and gas industry embodiment, the first unit 102 comprises an off-shore power receiving unit coupled to oil and gas equipment, and the second unit 104 comprises an on-shore power transmission unit. In another example discussed in more detail with respect to FIG. 8, the first unit 102 comprises power generators, such as wind turbine generators, and the second unit 104 comprises a receiving station that collects the generated power and provides the generated power to the on-shore power grid. In the embodiment of FIG. 1, the DC power transmission bus 106 is coupled between the first and second units 102 and 104 to carry power from the second unit 104 to the first unit 102. In one example, the DC power transmission bus 106 may comprise a high voltage direct current (HVDC) cable that is used for carrying power in a range from about 100 KW to about 100 MW. Since high voltage (HV) and DC current are transmitted or distributed in the system 100, the transmission bus/cable losses are significantly reduced, which in turn results in higher efficiency and less system cost.

Further, the DC power transmission bus 106 may be installed in a subsea location for a short distance or a long distance power transmission. In one example, the DC transmission bus 106 may be installed at a depth that is in a range from about 1 km to about 3 km in subsea and over a distance that is in a range from about 100 km to about 600 km between the first and second units 102, 104. In addition, as compared with three-phase AC power transmission, DC power transmission reduces the number and weight of cables/transmission buses, thus potentially reducing material and installation costs. It may be noted that the terms "DC power transmission bus," "HVDC power line," and "DC transmission bus" may be used interchangeably in the present disclosure.

In the embodiment of FIG. 1, the second unit 104 may include a power generation system 108 that is configured to generate AC power. In one example, the power generation system 108 may comprise a wind farm having one or more wind turbine generators. In another example, the power generation system 108 may include gas turbine generators or similar generators that are used to generate AC power. Further, the power generation system 108 may be coupled to one or more transmitting modules 110 that are configured to generate high voltage direct current (HVDC) power. In one embodiment, each of the transmitting modules 110 may include a plurality of industry standard modular power converters that are stacked and configured to convert the generated AC power to HVDC power. In some embodiments, the power generation system 108 may include one or more DC power sources, and one or more DC to DC type power converters may be used to generate HVDC power. Further, the HVDC power is transmitted to the first unit 102 via the DC transmission bus 106. It may be noted that the second unit 104 may be referred to as a top-side or on-shore side, where the power is generated, converted, and transmitted to the first unit 102. Similarly, the first unit 102 may be referred to as the sub-sea side or off-shore side, where the transmitted power is received, converted, and distributed to one or more electric/power loads 114. In one example, the electric loads/power loads may include electric drives and motors that are used for driving pumps and compressors for subsea processing. It may be noted that the second unit 104 may include other components such as control and communication electronics and is not limited to the components shown in FIG. 1.

The first unit 102 includes one or more receiving modules 112 that are connected between the DC transmission bus 106 and one or more electric loads 114 at the subsea or offshore locations. In one embodiment, where each of the loads comprises an AC load, each of the receiving modules 112 is configured to convert the HVDC power from the DC transmission bus 106 to an AC power. Particularly, each of the receiving modules 112 may include a plurality of industry standard modular power converters that are stacked and configured together to generate sub-sea distribution system voltages in response to HVDC power received by the DC transmission bus 106. These voltages may be distributed to the electric loads via one or more power distribution buses. Also, these converters may be reconfigurable based on site expansion requirements and load types and configurations. In one embodiment, the modular stacked converter topology at the first unit 102 of the DC transmission bus/link 106 may be symmetrical with the modular stacked converter topology at the second unit 104. It may be noted that the first unit 102 may include other components, and is not limited to the components shown in FIG. 1. For example, in some embodiments one or more of the loads may comprise a DC load.

In a conventional power delivery system, one or more optical cables are installed in addition to a DC transmission bus for communicating information between a sending end and a receiving end. In such embodiments, information such as electric load requirements and anomalies at the receiving end is transmitted to the sending end via the optical cables. However, the optical cables may become damaged or affected due to environmental conditions, and the information may not be successfully transmitted to the sending end. Also, there may be delay in sending the information via the optical cables. These problems may affect the power transmission in the system.

To address these problems/shortcomings, in the exemplary system, the information is communicated directly over the DC transmission bus 106 that is coupled between the first and second units 102 and 104. More specifically, the first unit 102 may add an alternating current (AC) component to the DC transmission bus 106. This AC component may represent status information, such as load requirements and/or anomalies at the first unit 102. The AC component may include any type of voltage, current, or power signal. Further, the anomalies may include faults in at least the electrical drives, compressors, pumps, and uninterrupted power supply (UPS). In one embodiment, one of the receiving modules 112 may add the AC component to the DC transmission bus 106 in such a way that the added AC component is undetectable by other modules and/or regulators in the first unit 102. It may be noted that the terms "status information" and "status" may be used interchangeably in the present disclosure.

At the second unit 104, the presence or absence of the added AC component in the DC transmission bus 106 may be detected to determine the status of the first unit. For example, the second unit 104 may detect a presence of a unique AC component in the DC transmission bus 106 that indicates the status information of a corresponding receiving module 112 of the first unit 102. In one embodiment, the AC component in the DC power transmission bus 106 may be eliminated or cancelled by using a compensatory AC component. Thereafter, the second unit 104 may determine the status information of the first unit 102 by using one or more parameters of this compensatory AC component. The one or more parameters may include frequency, phase, and/or amplitude of the compensatory AC component. The aspect of determining the status information will be explained in greater detail with reference to FIG. 3. Thereafter, the second unit 104 may use the determined status information of the first unit 102 to control the power transmission in the power delivery system 100. In one embodiment, the power transmission is controlled by adjusting the DC voltage or the DC current in the DC transmission bus 106 based on the status information of the first unit 102.

Figure 2:
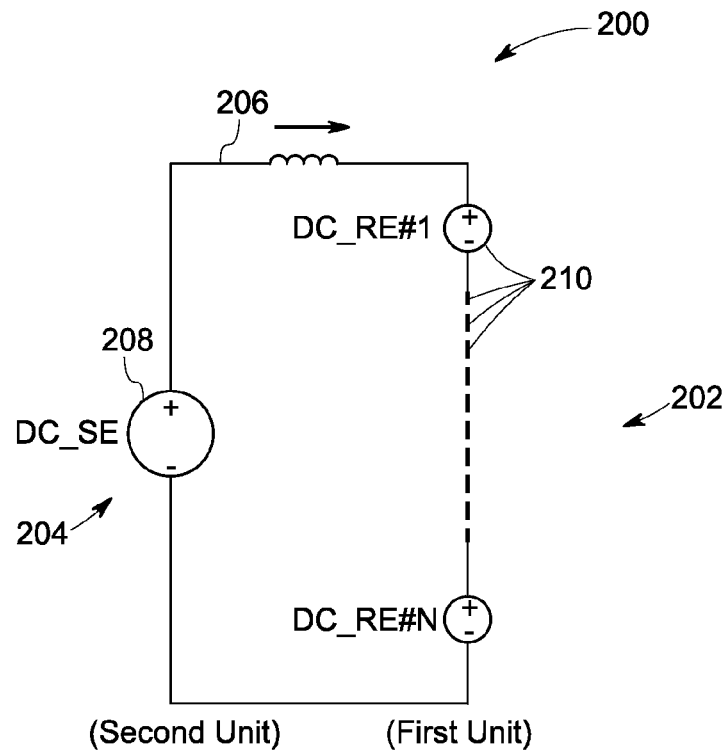
FIG. 2 is a simplified diagram of the power delivery system illustrating a DC power transmission, in accordance with aspects of the present disclosure.

Referring to FIG. 2, a simplified one line diagram of a power delivery system illustrating a DC power transmission, in accordance with aspects of the present disclosure, is depicted. Reference numeral 200 may be representative of the power delivery system 100 of FIG. 1. Similarly, reference numeral 202 may be representative of the first unit 102 and reference numeral 204 may be representative of the second unit 104 of FIG. 1. For ease of understanding, the second unit 204 is depicted by a DC power source 208 that generates a DC voltage to transfer the HVDC power on a DC transmission bus 206. It may be noted that the DC transmission bus 206 may be similar to the DC transmission bus 106 of FIG. 1. In one embodiment, the second unit 204 may include a plurality of DC power sources that are commonly controlled by a control unit (not shown) to maintain a constant DC link current in the power delivery system 200.

Further, the first unit 202 may include one or more receiving modules 210 that each comprise one or more power converters configured to receive the HVDC power from the DC transmission bus 206. The receiving modules 210 may be used to provide AC and/or DC voltage using the HVDC power from the DC transmission bus 206. Further, the generated voltage is provided to electric/power loads (not shown). Since each of the receiving modules 210 may be coupled to different loads, the voltage needed by one of the modules 210 may be different from the other of the modules 210. Thus, each of the modules 210 may be independently controlled depending upon its specific load requirements.

In addition, each of the receiving modules 210 may change its load requirement or may have one or more anomalies, which may affect the normal operation of the system. For example, one of the components, such as a converter, may fail to supply power to the electric load. In another example, the electric load of one of the receiving modules 210 may be disconnected, which in turn reduces the power requirement at the first unit 202. In such instances, the first unit 202 communicates status information to the second unit 204 so that the amount of power transmission to the first unit 202 is controlled. The status information may include at least the anomalies and/or load requirements at the first unit 202.

Figure 3:
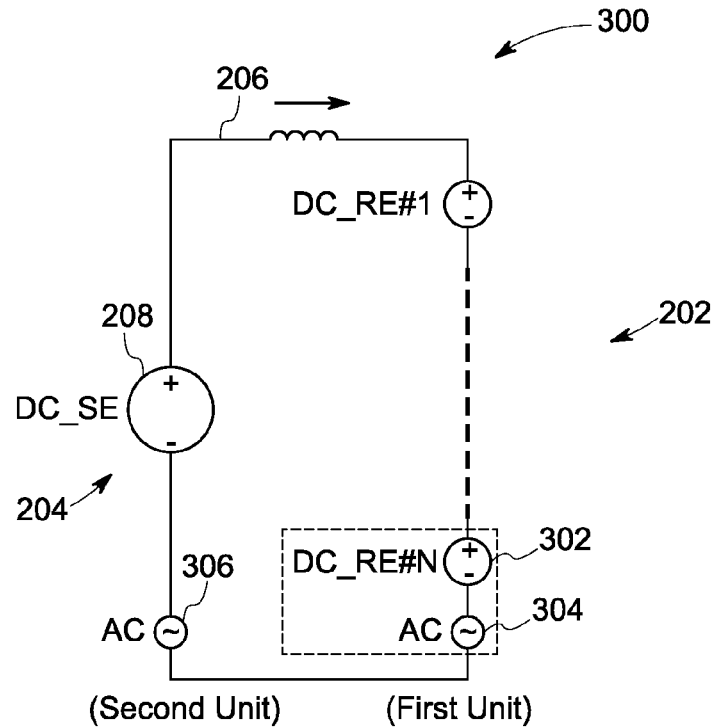
FIG. 3 is a simplified diagram of the power delivery system communicating information on a DC transmission bus, in accordance with aspects of the present disclosure.

In an exemplary embodiment, this status information is communicated by adding an AC component to the DC transmission bus 206, as depicted in FIG. 3. Particularly, one of the receiving modules 210, for example receiving module 302, communicates the status information by adding a corresponding AC component to the DC transmission bus 206. More specifically, in one embodiment, parameters such as the frequency, the amplitude, and/or the phase of the AC component may indicate the status information of the particular receiving module 302. Also, the parameters of the AC component may be selected within a range that is undetectable by the other modules and/or regulators at the first unit 202 and detectable by the second unit 204. In one example, the AC component may have a frequency that is in a range from about a couple of Hertz to several hundreds of Hertz, and is undetectable by other modules in the first unit 202. In another example, the AC component may have an amplitude that is sufficient enough to be detected by the second unit 204 after the AC component flows through an impedance of the DC transmission bus 206. An AC component may be selected to have a sufficiently low frequency so that a constant DC link current in the DC transmission bus 206 is undisturbed while transmitting the AC component over the DC transmission bus 206. Further, in the embodiment of FIG. 3, a first AC source 304 may be used to add the AC component to the DC transmission bus 206.

Further, the second unit 204 may determine the status information of the first unit 202 by identifying the presence or absence of the AC component in the DC transmission bus 206. In one specific example, AC components having different values are transmitted during normal operating conditions in the DC transmission bus 106. Each of the AC components may be associated with their respective receiving module in the first unit 202. In case of anomalies, the AC component of a corresponding receiving module that is having the anomalies may either not be transmitted over the DC transmission bus 206 to indicate that a specific normal condition is not occurring or be altered to provide the relevant information. In the first instance, the second unit 204 may identify the absence of this AC component in the DC transmission bus 206 and may determine the status information that is associated with the absence of this AC component. In another example, the first unit 202 only sends an AC component when the first unit 202 is experiencing the anomalies or unusual load conditions. The second unit 204 may then identify the presence and attributes of the AC component in the DC transmission bus 102 to determine the status information of the first unit 202.

In one embodiment, a compensatory AC component is used to determine the status information of the first unit 202. For example, the second unit 202 may use a second AC source 306 to generate the compensatory AC component. The compensatory AC component may have same frequency and amplitude as the added AC component in the DC transmission bus 206, but with an opposite phase. This compensatory AC component is added to the DC transmission bus 206 to cancel or eliminate the AC component in the DC transmission bus 206. Because the frequency and the amplitude of the compensatory AC component is same as the added AC component, the second unit 204 may determine the frequency and/or the amplitude of the required compensatory AC component and use that information to determine the status information of the first unit 202. In one example, the second unit 204 may use a look-up table to identify anomalies and/or load requirements that are corresponding to the frequency and/or amplitude of the compensatory AC component.

Figure 7:
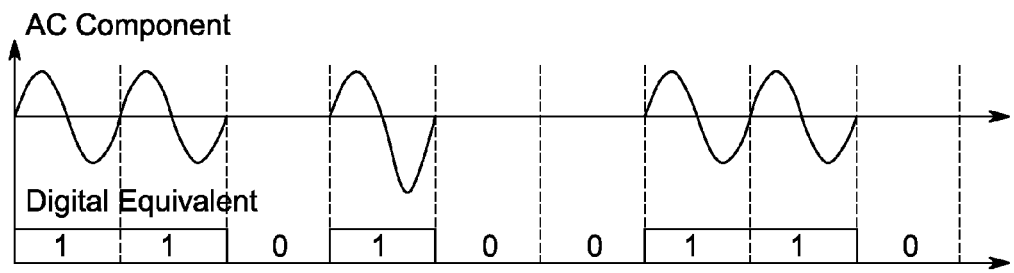
FIG. 7 illustrates a signal waveform of encoded cycles comprised in an AC component of the first unit, in accordance with aspects of the present disclosure.

In another embodiment, the second unit 204 may determine the status information of the first unit 202 by decoding a digital signal that represents the AC component in the DC transmission bus 206. FIG. 7 illustrates one embodiment of such a digital signal. In this example, the first unit 202 may add a sequence of encoded cycles to the DC transmission bus 206. The sequence of encoded cycles may indicate the status information of the first unit 202. A positive cycle or the presence of a cycle may indicate a digital bit '1,' while a negative cycle or the absence of a cycle may indicate a digital bit '0.' Further, the second unit 204 may decode this digital signal in the DC transmission bus 206 to determine the status information of the first unit 202. In addition, the second unit 204 may also identify the receiving module that transmits this status information. For example, the digital signal having bits "11101" may indicate that the status information is transmitted from the receiving module 302 of the first unit 202.

Figure 4:
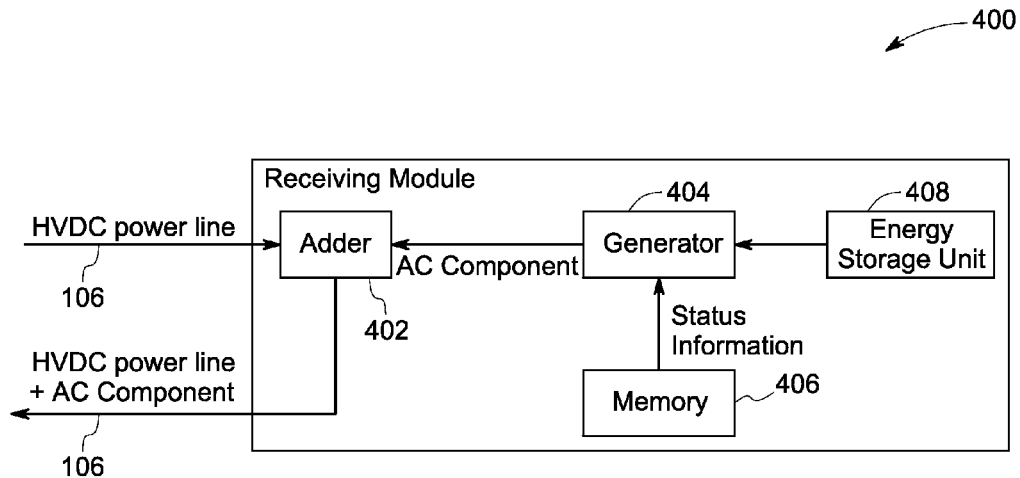
FIG. 4 is a block diagram of a receiving module in the first unit, in accordance with aspects of the present disclosure.

Referring to FIG. 4, a block diagram of a receiving module in a first unit, in accordance with aspects of the present disclosure, is depicted. The receiving module 400 may be representative of one of the receiving modules 112 in FIG. 1. For ease of understanding of the present disclosure, the receiving module 400 is described with reference to the components of FIGS. 1-3. It may be noted that the first unit 102 may include one or more receiving modules, and each of the receiving modules may include components as depicted in FIG. 4. In another embodiment, each of the receiving modules in the first unit 102 may be coupled to a common unit having the components as depicted in FIG. 4.

In the embodiment of FIG. 4, the receiving module 400 includes an adder 402, a generator 404, a memory 406, and an energy storage unit 408. The memory 406 is configured to store status information of the receiving module 400. It may be noted that the status information of each of the receiving modules may collectively represent the status of the first unit 102. The status information may include anomalies and/or load requirements at the first unit 102. This status information is provided to the generator 404 to generate an AC component or voltage. Particularly, reactive power stored in the energy storage unit 408 may be utilized by the generator 404 to generate the AC component that represents the status information of the receiving module 400. Moreover, the AC component is generated at low enough frequency and at low enough amplitude so that a constant DC link current in the DC transmission bus 106 is unaffected when the AC component is added to the DC transmission bus 106. Also, this AC component is undetectable by other receiving modules or regulators in the first unit 102. In one example, the AC component may be generated at a frequency that is in a range from about a couple of hertz to several hundred hertz. Further, the generated AC component is provided to the adder 402 that adds the generated AC component to the DC transmission bus 106. It may be noted that each of the receiving modules may add its respective AC component to the DC transmission bus 106 to indicate the overall status of the first unit 102.

Figure 5:
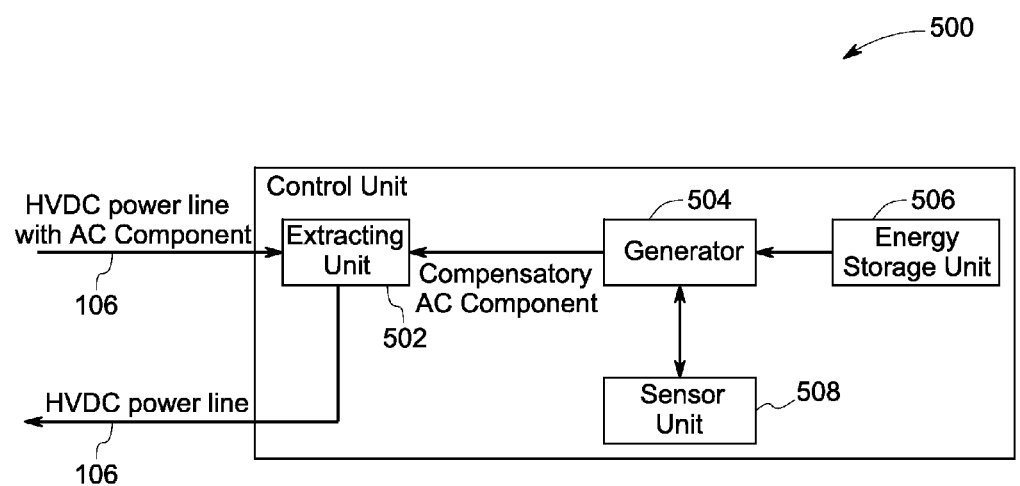
FIG. 5 is a block diagram of a control unit in the second unit, in accordance with aspects of the present disclosure.

Referring to FIG. 5, a block diagram of a control unit in a second unit, in accordance with aspects of the present disclosure, is depicted. For ease of understanding of the present disclosure, the control unit 500 is described with reference to the components of FIGS. 1-3. It may be noted that the control unit 500 may include other components, such as power generators and converters, and is not limited to the components depicted in FIG. 5.

In the embodiment of FIG. 5, the control unit 500 includes an extracting unit 502, a generator 504, an energy storage unit 506, and a sensor unit 508. The generator 504 may generate a compensatory AC component by using active or reactive power stored in the energy storage unit 506. In one embodiment, the compensatory AC component may be generated by using the power produced by the power generators in the second unit 104. The compensatory AC component may have the same amplitude and the frequency as the added AC component in the DC transmission bus 106. However, the phase of the compensatory AC component is opposite to the added AC component in the DC transmission bus 106. In one embodiment, the generator 504 may be coupled to a sensor unit 508 that is configured to sense the added AC component in the DC transmission bus 106. In addition, the sensor unit 508 may determine a phase of the added AC component in the DC transmission bus 106. Further, the generator 504 may receive this phase information from the sensor unit 508 and may generate the compensatory AC component having opposite phase as that of the added AC component. Further, the compensatory AC component is provided to the extracting unit 502 to eliminate the added AC component in the DC transmission bus 106. Particularly, the extracting unit 502 may add the compensatory AC component to the DC transmission bus 106 so that the compensatory AC component having opposite phase may cancel the AC component in the DC transmission bus 106.

In the above embodiment, the added AC component was sensed and then used to generate a known compensatory AC component. In another embodiment, a sense and perturb approach can be used where the AC component is added by the extracting unit 502 to the DC transmission bus 106 and adjusted until no AC component is detected on the bus 106. The amount of AC component being added by the extracting unit 502 is then identified as the compensatory AC component. Because the frequency and the amplitude of the AC component in the DC transmission bus 106 is same as the frequency and the amplitude of the compensatory AC component, the extracting unit 502 may then determine the status information of the first unit 102 by using at least one of the frequency, the amplitude, and the phase of the compensatory AC component.

Whether the added AC component is directly sensed or inferred via the nature of the required compensatory AC component, in one embodiment, the extracting unit 502 may use a look-up table to determine the status information of the first unit 102. More specifically, the look-up table may have different frequencies that are associated with status information of a corresponding receiving module 112 in the first unit 102. By identifying the attributes of the added or compensatory AC component, the extracting unit 502 may determine the status information of a particular receiving module 112. In one example, if the frequency of the AC component is a range from 80 Hertz to 120 Hertz, the extracting unit 502 may first determine that the status information of a particular receiving module, for example receiving module 302, is received. Further, by knowing the frequency value of the AC component, the extracting unit 502 may identify the corresponding status information in the look-up table. In another embodiment, the extracting unit 502 determines the status information of the first unit 102 by identifying the presence or absence of the AC component in the DC transmission bus 106. It may be noted that the extracting unit 502 may use other methods or algorithms for determining the status information of the first unit 102.

Upon determining the status information, the control unit 500 may control the power transmission in the system 100. In one example, if the status information indicates that the electric load is removed or reduced, the control unit 500 may reduce the DC power transmission on the DC transmission bus 106 so that the second unit DC voltage is matched with the first unit DC voltage. Also, by controlling the power transmission, a steady state is maintained, which in turn improves the efficiency of power transmission in the power delivery system 100.

Figure 6:
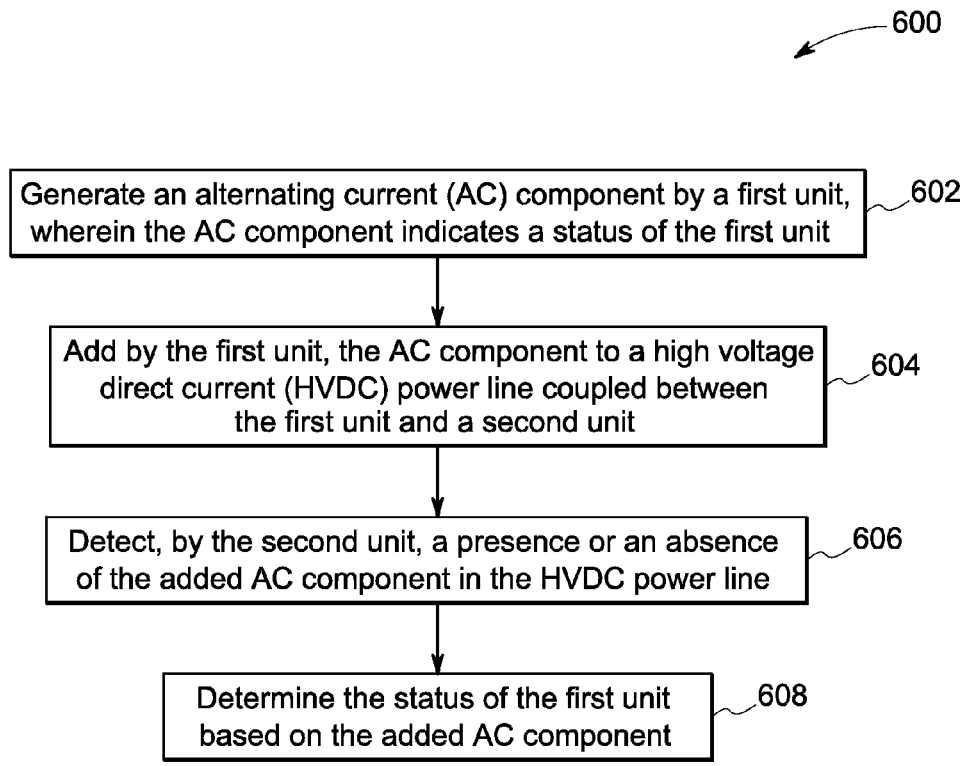
FIG. 6 is a flow chart illustrating a method for communicating information on the DC transmission bus, in accordance with aspects of the present disclosure.

Referring to FIG. 6, a flow chart illustrating a method for communicating information on a DC transmission bus, in accordance with aspects of the present disclosure, is depicted. For ease of understanding of the present disclosure, the method is described with reference to the components of FIGS. 1-5. The method begins at step 602, where an AC component is generated by a first unit 102. The AC component may indicate a status of the first unit 102. In one example, the status may include anomalies and/or load requirements at the first unit 102. The first unit 102 may generate the AC component using a particular frequency that indicates the status of the first unit 102.

Subsequently, at step 604, the generated AC component is added to a HVDC power line 106 that is coupled between the first unit 102 and a second unit 104. In one embodiment, one of the receiving modules in the first unit 102 is configured to add the AC component to the HVDC power line 106 in such a way that the AC component is undetectable by at least one of other modules and regulators in the first unit 102. Also, the AC component is added to the HVDC power line 106 in such a way that a DC link current in the HVDC power line is maintained constant between the first unit 102 and the second unit 104.

In addition, at step 606, the presence or absence of the added AC component is detected in the HVDC power line 106. To that end, the second unit 104 may monitor the HVDC power line 106 to detect the presence or absence of the AC component.

Furthermore, at step 608, the status of the first unit 102 is determined based on the added AC component in the HVDC power line 106. To that end, the second unit 104 may determine the status of the first unit 102. In one embodiment, the added AC component may be sensed directly and used to determine the status of the first unit. In another embodiment, the second unit 104 may use a compensatory AC component to determine the status of the first unit 102. More specifically, the second unit 104 may use a look-up table that shows the frequency, the amplitude, and/or the phase values and their corresponding status information of the first unit 102. Thereafter, the second unit 104 may adjust the DC voltage and/or the DC current in the HVDC power line 106 based on the status of the first unit 102 so that the power transmission is controlled in the power delivery system 100. Also, by controlling the power transmission, a steady state is maintained in the power delivery system 100, which in turn improves the efficiency of power transmission in the system 100.

Figure 8:
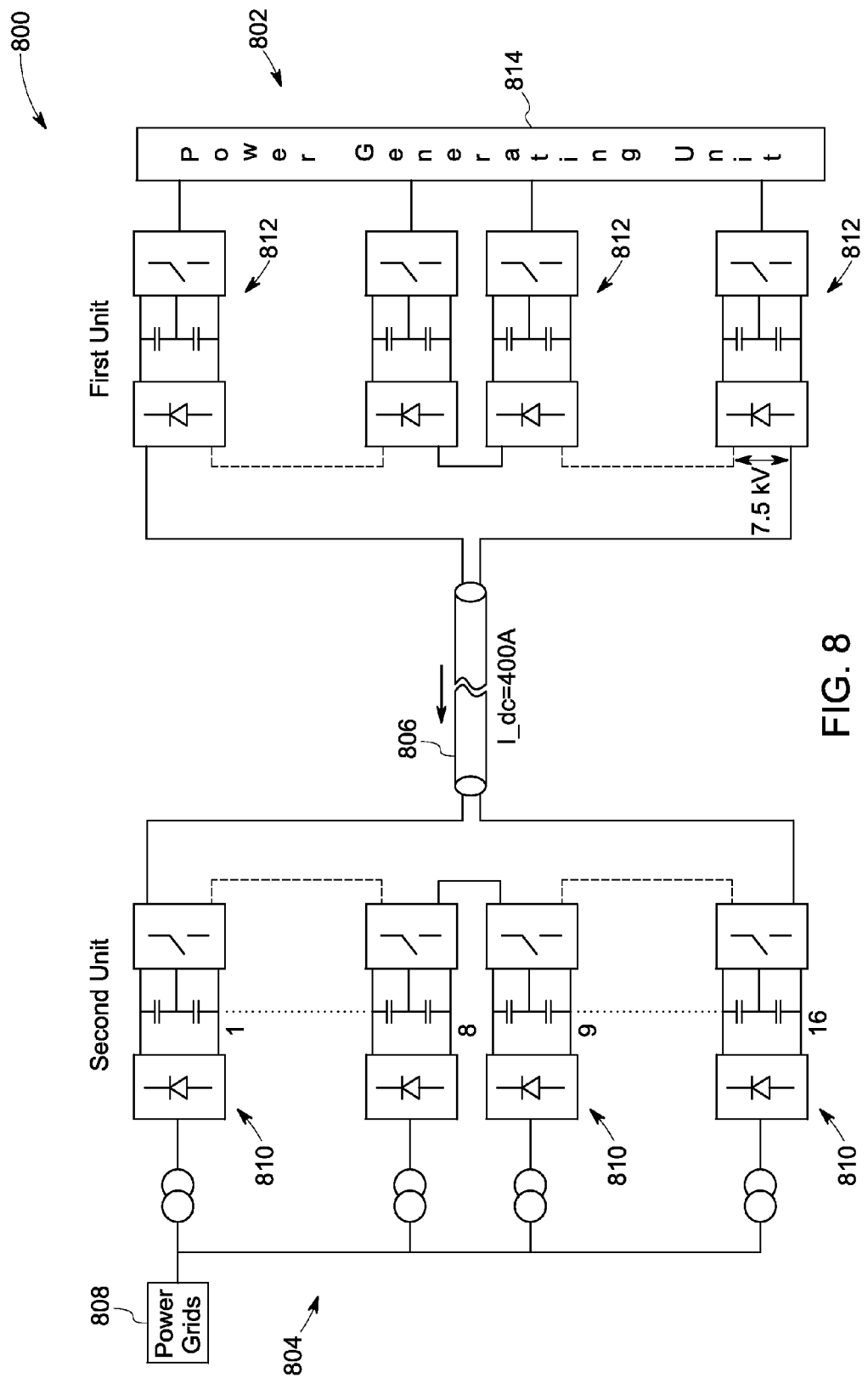
FIG. 8 is a diagram of a power delivery system illustrating a direct current (DC) power transmission from a first unit to a second unit, in accordance with aspects of the present disclosure.

Referring to FIG. 8, a power delivery system 800 illustrating a direct current (DC) power transmission, in accordance with aspects of the present disclosure, is depicted. The power delivery system 800 is similar to the power delivery system 100 of FIG. 1, except that the first unit 802 comprises a power generating unit 814 and the second unit 804 comprises on-shore power grids 808. The power generating unit 814 may include power generators such as wind turbine generators, and is coupled to the receiving modules 812 as depicted in FIG. 8. The power generating unit 814 is configured to transmit HVDC power on an HVDC power line 806. Similarly, the second unit 804 includes the on-shore grids that are configured to receive the HVDC power from the HVDC power line 806 that is coupled between the first unit 802 and the second unit 804.

The various embodiments of the system and method aid in controlling the power transmission and improving the efficiency of power transmission in the power delivery system. Also, no additional high power hardware or cable is required for communicating information as the existing DC transmission bus may be used for communicating such information. In addition, since no additional hardware is used, the system operation is undisturbed and also the installation and maintenance cost is substantially reduced.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power transmission system comprising:
   a first unit for carrying out the steps of:
      receiving high voltage direct current (HVDC) power from an HVDC power line;
      generating an alternating current (AC) component indicative of a status of the first unit;
      adding the AC component to the HVDC power line;
   a second unit for carrying out the steps of:
      generating a direct current (DC) voltage to transfer the HVDC power on the HVDC power line, wherein the HVDC power line is coupled between the first unit and the second unit;
      generate a compensatory AC component to eliminate the added AC component in the HVDC power line; and
      determine the status of the first unit based on the generated compensatory AC component.

2. The power transmission system of claim 1, wherein the status of the first unit comprises one or more anomalies at the first unit.

3. The power transmission system of claim 1, wherein the status of the first unit comprises one or more load requirements at the first unit.

4. The power transmission system of claim 1, wherein the first unit comprises a plurality of modules coupled to one or more power loads, and wherein each of the plurality of modules generates an unique alternating current (AC) component based on at least the status of the respective module of the first unit.

5. The power transmission system of claim 4, wherein each of the modules in the first unit is configured to add the unique AC component to the HVDC power line in such a way that the added AC component is undetectable by at least one of other of the plurality of modules in the first unit.

6. The power transmission system of claim 1, wherein the first unit comprises an energy storage unit configured to provide reactive power for generating the AC component.

7. The power transmission system of claim 1, wherein the second unit is configured to identify at least one of a frequency, an amplitude, and a phase of the compensatory AC component to determine the status of the first unit.

8. The power transmission system of claim 1, wherein the added AC component comprises a plurality of encoded cycles indicating the status of the first unit.

9. The power transmission system of claim 1, wherein the second unit comprises a control unit for adjusting at least one of the DC voltage and a DC current in the HVDC power line based on the status of the first unit.

10. The power transmission system of claim 1, wherein the first unit is coupled to at least one power load comprising oil and gas equipment.

11. A method comprising:
generating an alternating current (AC) component by a first unit, wherein the AC component indicates a status of the first unit;
adding, by the first unit, the AC component to a high voltage direct current (HVDC) power line coupled between the first unit and a second unit;
generating a compensatory AC component, by the second unit, to eliminate the added AC component in the HVDC power line; and
determining the status of the first unit, by the second unit, based on the compensatory AC component.

12. The method of claim 11, wherein adding the AC component to the HVDC power line comprises adding the AC component to the HVDC power line in such a way that the AC component is undetectable by at least one of other modules and regulators in the first unit.

13. The method of claim 11, wherein adding the AC component to the HVDC power line comprises adding the AC component to the HVDC power line in such a way that a direct current (DC) link current in the HVDC power line is maintained constant between the first unit and the second unit.

14. The method of claim 11, wherein determining the status of the first unit comprises identifying at least one of a frequency, an amplitude, and a phase of the compensatory AC voltage to determine the status of the first unit.

15. The method of claim 11, wherein determining the status of the first unit comprises decoding a plurality of encoded cycles comprised in the added AC component to determine the status of the first unit.

16. The method of claim 11, wherein determining the status of the first unit further comprises adjusting a DC voltage or a DC current in the HVDC power line at the second unit based on the status of the first unit.

17. A power transmission system comprising:
a first unit for carrying out the steps of:
transmitting high voltage direct current (HVDC) power on an HVDC power line;
generating an alternating current (AC) component indicative of a status of the first unit;
adding the AC component to the HVDC power line;
a second unit for carrying out the steps of:
receiving the HVDC power from the HVDC power line, wherein the HVDC power line is coupled between the first unit and the second unit;
generating a compensatory AC component to eliminate the added AC component in the HVDC power line; and
determining the status of the first unit based on the generated compensatory AC component.

18. The power transmission system of claim 17, wherein the first unit is coupled to a power generation unit comprising a wind turbine.

* * * * *